UNITED STATES PATENT OFFICE.

MAX STERN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL PRODUCT.

1,052,762.     Specification of Letters Patent.     Patented Feb. 11, 1913.

No Drawing.     Application filed August 17, 1911. Serial No. 644,527.

*To all whom it may concern:*

Be it known that I, MAX STERN, doctor of philosophy, chemist, citizen of the German Empire, residing at Elberfeld, Germany, have invented new and useful Improvements in New Pharmaceutical Products, of which the following is a specification.

Hydrogen peroxid is as is well known a very unstable compound. As it is a valuable pharmaceutical product, largely used for medicinal purposes, the possibility of preparing at any time solutions of definite composition from a stable solid compound would be of great importance and the production of such a solid and stable compound capable of liberating hydrogen peroxid under suitable conditions very valuable.

I have now discovered a solid stable product containing a definite quantity of $H_2O_2$, which in contact with water liberates $H_2O_2$ and solutions of $H_2O_2$ can be at any time prepared from it containing definite quantities of $H_2O_2$. This new compound is produced by treating carbamid ($NH_2$—CO—$NH_2$) with hydrogen peroxid or with products or mixtures capable of producing hydrogen peroxid at a temperature below that at which decomposition, and the formation of products of decomposition, takes place. In general the temperature should be maintained below 50° C. since urea, in aqueous solution, is easily decomposed, even at this temperature with the formation of carbonate of ammonia, which, if the solution is not acid, brings about further decomposition. The process can be carried out advantageously by gently heating, e. g. at temperatures of about 40° C. or below.

In order to illustrate the new process more fully the following examples are given, the parts being by weight:—

Example 1: 600 parts of carbamid are dissolved by gentle heating in 1500 parts of a 30 per cent. hydrogen peroxid solution. The new compound containing about 36.2 per cent. $H_2O_2$ separates on cooling. It can be crystallized from water at about 40° C. It forms colorless prisms which when mixed with water, liberate $H_2O_2$ and evolve oxygen when heated to 85° C. The aqueous solution separates iodin from potassium iodid on acidulation and oxygen if the solution is not acidulated.

Example 2: 170 parts of barium superoxid are added to a solution of 60 parts of carbamid in 500 parts of water. Carbonic acid is passed then through the mixture until all superoxid is decomposed. Barium carbonate is removed by filtration. The new compound is isolated from the filtrate by evaporating the filtrate *in vacuo* at 40° C. Instead of carbonic acid the calculated quantity or more of sulfuric acid, oxalic acid or phosphoric acid can be used.

Example 3: 600 parts of carbamid are dissolved by gentle heating in 1500 parts of a 20 per cent. hydrogen peroxid solution containing 1.2 per cent. of sulfuric acid. The new compound containing about 36.2 per cent. $H_2O_2$ separates on cooling. It is a stable compound, containing substantially the theoretical content of $H_2O_2$, and is substantially free from decomposing impurities resulting from the process of production.

I claim:—

1. Process for producing a new pharmaceutical product, which process consists in treating at a temperature below that at which decomposition takes place carbamid ($NH_2$—CO—$NH_2$) with hydrogen peroxid, substantially as described.

2. Process for producing a new pharmaceutical product, which process consists in treating at a temperature below that at which decomposition takes place carbamid with compounds capable of producing hydrogen peroxid, substantially as described.

3. Process for producing a new pharmaceutical product, which process consists in treating at a temperature below that at which decomposition takes place carbamid with hydrogen peroxid containing an acid, substantially as described.

4. Process for producing a new pharmaceutical compound, which process consists in treating at a temperature below that at which decomposition takes place and in the presence of an acid, carbamid with compounds capable of producing hydrogen peroxid, substantially as described.

5. The herein described new pharmaceutical product having the formula $NH_2—CO—NH_2.H_2O_2$, which forms prisms evolving oxygen when heated to 85° C., containing substantially 36.2 per cent. $H_2O_2$ and being substantially free from decomposing impurities and being a stable and valuable pharmaceutical compound liberating hydrogen peroxid when mixed with water, substantially as described.

In testimony whereof I have hereunto set my hand in the presence of two subscribing witnesses.

MAX STERN. [L. S.]

Witnesses:
ALBERT F. NUFER,
ALFRED HENKEL.